Figure 1:
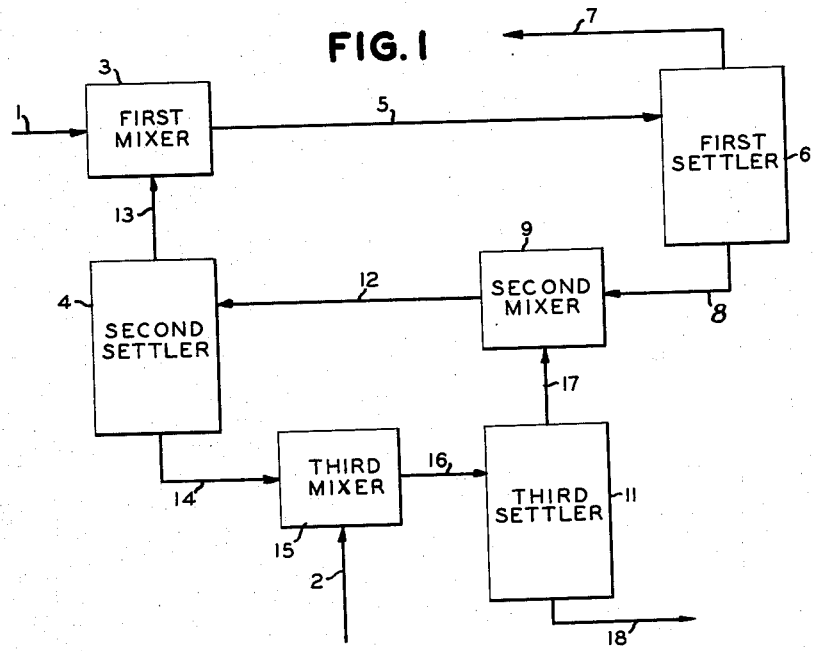

Oct. 31, 1961  F. W. WEST ET AL  3,006,938
REFINING OF TREE BARK WAX
Filed Nov. 28, 1956

INVENTORS
FRED W. WEST
LEO FRIEND
BY G. H. Palmer
Ernest Cheslow
ATTORNEYS

United States Patent Office 3,006,938
Patented Oct. 31, 1961

3,006,938
REFINING OF TREE BARK WAX
Fred W. West, Paterson, N.J., and Leo Friend, New Rochelle, N.Y., assignors to The M. W. Kellogg Company, Jersey City, N.J., a corporation of Delaware
Filed Nov. 28, 1956, Ser. No. 624,940
17 Claims. (Cl. 260—412.8)

This invention relates to a process for producing a valuable hard wax from the bark of trees. More specifically, this invention relates to a process for refining Douglas fir bark wax which is soluble in normally liquid paraffins.

Hard waxes are valuable in the preparation of paste and emulsion polishes because they form glossy hard coatings which can be repolished after being marred. They are also useful for carbon paper manufacture.

There are many hard waxes on the market for use in the industry. Among these carnauba is one of the most popular. This wax and many other preferred hard waxes are imported from foreign countries, chiefly in South America.

The imported waxes vary considerably in quality and the prices fluctuate in an unpredictable manner. Because of a general dissatisfaction with this situation, there is a ready market for a domestic source of a hard wax stable in quality and price.

It has been found recently that one of the most promising domestic sources of hard wax is the bark of several kinds of trees found in abundance. The bark of the Douglas fir tree is outstanding in this respect.

Waxy materials have been extracted from Douglas fir bark by the use of organic solvents. For example, extraction of Douglas fir bark with hexane produces a yellow wax having a melting point of about 60° C. and extraction with benzene or with a low-boiling halogenated aliphatic hydrocarbon produces a brown wax of about the same melting point but having a higher saponification number. It is to be understood that both the yields and the qualities of wax thus produced may vary, depending upon the particular extractant and the conditions used, and on such factors as the age of the tree, the time of the year, and the portion of the tree from which the bark is scraped. Unfortunately, even the best of the tree bark waxes obtained by such extraction are too soft, too low in melting point and too poor in solvent retention to be competitive in properties with the standard waxes such as carnauba.

A method for improving the properties of wax extracted from Douglas fir bark is described in the copending patent application of Fred William West, one of the co-inventors herein, Serial No. 624,939, filed November 28, 1956.

In this refining method the Douglas fir bark wax is treated with hot methanol or other low boiling alcohol. The material insoluble in hot methanol is filtered away, and the methanol filtrate is allowed to cool. The wax that precipitates from the solution is recovered by filtration. The wax precipitate at this point is the desirable hard wax fraction. The material that remains dissolved in the methanol may be recovered as a dark, semi-liquid substance, hereinafter referred to as "balsam."

The method described above affords a hard wax superior to the crude wax extracted from the tree bark but it is necessary to repeat the operation several times in order to obtain a wax comparable in properties to the standard hard waxes. Difficulty is encountered in the filtration steps. Moreover, when the crude wax is subjected to the process several times to obtain a superior hard wax there is concomitant loss of material which results in a low yield of product. In general, the methanol refining method does not lend itself well to the most economical operation on a large scale.

It is an object of this invention to produce a valuable hard wax from the bark of the Douglas fir tree.

It is a further object of this invention to provide a method for improving the wax extracted from Douglas fir bark with organic solvents.

It is a further object of this invention to provide a method for improving the wax from Douglas fir bark which is convenient and economical, and suitable for a large scale industrial operation.

It is another object of this invention to provide a wax from Douglas fir bark which has a higher melting point, greater hardness and better solvent retention properties than the wax heretofore separated by prior art methods from the bark.

It is a further object of this invention to provide a wax which will be useful in the formulation of various wax polishes, such as those used for floors, furniture and automobiles, in the formulation of carbon paper inks, in investment casting and in applications for which a hard wax is desirable.

It is also an object of this invention to provide a process for separating into useful fractions wax obtained from Douglas fir bark which is soluble in a normally liquid paraffin solvent.

These and other objects and advantages will be apparent to those skilled in the art from the following description.

The objects of the invention are accomplished by taking at least a portion of the wax from Douglas fir bark which is soluble in a normally liquid paraffin solvent and fractionating it in an immiscible liquid/liquid system consisting of a normally liquid paraffin phase in contact with an alcohol phase and recovering the hard wax fraction from the paraffin solvent phase.

For purposes of description the wax extracted from Douglas fir bark with a normally liquid paraffin will hereinafter be referred to as the "crude wax."

A complete description of the methods of extracting crude wax from Douglas fir bark may be found in the U.S. Patent to Kurth, No. 2,662,893, issued December 15, 1953.

Generally, the bark is ground to pass a screen test containing ⅜ inch perforation. The moisture content is around 30% by weight. The bark is charged to an extractor. The solvent, as for example hexane, at a temperature of about 55–60° C. is passed through the bark and withdrawn from the extractor with its content of dissolved wax. The solvent is removed by steam stripping, leaving behind the wax product.

When hexane is used as the extraction solvent a wax is obtained which has some good qualities as compared to the waxes recovered with other solvent, but this hexane-soluble wax is lacking in several fundamental properties demanded of a high quality hard wax:

(1) The melting point is low: 60–63° C. (vs. 86° C. for carnauba, 79–84° C. for ouricuri and 79–81° C. for sugar cane wax).

(2) The hardness is low: 0.4–1.0 mm. needle penetration (vs. less than 0.1 mm. for carnauba, ouricuri and oxidized microcrystalline).

(3) The "solvent binding power" or paste properties are poor. Very soft pastes are formed and are extremely thixotropic, i.e., they liquify if mildly agitated.

(4) Films of the wax have poor gloss, are tacky, and smear and mar easily.

(5) Emulsions of the wax are soapy and tend to gel, and they do not dry to glossy hard films.

(6) The acid number of the wax is high, requiring a large amount of alkaline material for neutralization with the formation of large soap concentrations.

(7) Color and odor are acceptable for many applications but the color is not equal to refined and bleached grades of other waxes.

To obtain the highest quality hard wax by the process of this invention, it is necessary to remove the components which are insoluble in hot methanol. This removal step may take place either before or after the liquid/liquid extraction refining step. The material which is insoluble in hot methanol is resinous in character. For certain uses it may be left in the wax fraction to produce a higher yield of hard wax, but for most uses, it is preferred that the resinous methanol insolubles be removed.

The normally liquid paraffin used in the paraffin phase of the liquid/liquid extraction can be any of the substantially saturated aliphatic hydrocarbons in the range up to about ten carbon atoms. Branched chain paraffins may be used but they are not as suitable as the straight chain compounds for separating the most desirable hard wax fraction. Normally liquid paraffins are those which are liquid under ordinary conditions of temperature and pressure, i.e., room temperature and atmospheric pressure.

It is not necessary to employ pure hydrocarbon compounds as the normally liquid paraffin phases in the extraction process. The use of paraffinic petroleum naphtha cuts is practical and economical. The particular paraffinic naphtha cuts which are desirable are those with a boiling range which falls between the temperature limits of about 50° and 175° C. If desired, the normally liquid paraffin used may be identical with that used to extract the crude wax from the bark; or, the crude wax extract solution in a normally liquid paraffin may be passed directly to the liquid/liquid extraction step without the intermediate recovery of the crude wax from its extractant.

The alcohol phase can be any of the monohydric or polyhydric alcohols in the $C_1$ to $C_4$ range, e.g., methanol, ethanol, ethylene glycol, n-propanol, isopropanol, n-butanol, propylene glycol, isobutanol, etc. It is essential to the process that the two phases be immiscible so it may be required to add water to the alcohol phase but only in the amounts necessary to keep the phases separated. The amount of water depends on the particular alcohol used, the particular paraffin used, and the temperature of the extraction process. If desired, water may be added in an amount somewhat in excess of the minimum required for immiscibility in order to control the selectivity of the system. The amount of water can vary from about 0.5 to 10 percent based on the volume of the alcohol.

In the liquid/liquid refining process of this invention the crude wax may be introduced into the solvent system dissolved in either of the immiscible phases. The process can be performed either batchwise or in a continuous method. The latter method is most suitable for large scale industrial operation.

For convenience, the methods of this invention will be described using n-heptane and methanol as the immiscible solvent phases.

For small scale processing, a simple method of refining Douglas fir wax by this invention is by the use of a single stage batch operation. The crude wax can be dissolved in either of the two solvents used as the immiscible phases of the system. The solution of the wax is contacted with the other solvent phase and agitated to allow proper equilibration of the wax components between the phases. The operation may be conducted at a temperature between about 20° C. and 150° C., depending on the solvent phases used and on the particular distribution of wax components in the phases desired. A preferred temperature range is from about 40° to 100° C. Pressures may be used for the better control of the process, but they do not affect the quality of the wax products, except insofar as the temperature of the extraction is affected by the pressure.

As stated previously, if it is desirable to remove the resinous material from the wax, then it is most convenient to dissolve the crude wax in the alcohol phase, e.g., methanol, at a temperature of about 50° C. The insoluble resinous material is removed and the methanol phase is then contacted with the paraffin phase, e.g., n-heptane.

It is possible to remove the resinous material after the liquid/liquid extraction process. In this case, the crude wax, including the resinous components, is dissolved in the heptane phase, and the resulting wax solution is contacted with methanol at a temperature of about 50° C. The methanol contains enough water to keep the phase immiscible. When the agitated phases have been allowed to stratify then the wax fraction remaining in the heptane solvent is recovered and treated with hot methanol. The insolubles are removed and the refined wax is recovered by precipitation with water or by flashing off of the solvent. If the resinous components are desirable in the wax, then the hot methanol treatment step for removal of insolubles is eliminated.

It is clear that the properties of the refined wax will vary somewhat depending on the particular process variation employed. If the resinous material is allowed to remain in the refined wax for better yield, then the wax may not lose in hardness or gloss, but the emulsifiability may be poorer. If the crude wax is treated in the first step with hot 95% methanol in order to remove resinous wax components, then the final wax will have somewhat different properties than wax which has the resinous material removed from the wax fraction in the heptane phase using hot absolute methanol.

A refinement of the single stage contact extraction described above is the use of a continuous multiple stage contact system.

For large scale treatment, a liquid/liquid extraction process may be accomplished in a countercurrent multiple contact system as illustrated by FIGURE 1. The fresh heptane solvent and the methanol-wax solution are sent to opposite terminals of a series of extraction stages. The phases pass continuously and countercurrently from stage to stage through the system. The extract layer from the $n$th stage becomes the extractant for the $(n-1)$th, and the raffinate layer leaving the $(n-1)$ stage becomes the feed to be extracted in the $n$th stage. Any number of contact stages may be employed but the usual number varies from three to six. The system may consist of a series of mixers and settlers, or it may be some form of a continuous plate column.

In one version of the extraction process the crude wax is dissolved in the alcohol phase, e.g., methanol. In this modification, crude wax may be dissolved in hot methanol, settled or decanted to remove resinous insolubles and then passed to the liquid/liquid extraction refining step. Hence, in one manipulation, the resinous material is removed and the wax is ready for the extraction step. If a small amount of water is needed in the alcohol phase to keep it immiscible when is it subsequently contacted with the paraffin phase in the liquid/liquid extraction system, then it is advantageous to have the water included in the alcohol in the first step when dissolving the crude wax. The water can be added after the wax is dissolved but in some cases it may locally precipitate some wax.

Preferably, the crude wax is treated with between about 2 and 20 volumes of alcohol solvent at a temperature between about 40 and 150° C. Using methanol as a solvent, the insoluble fraction comprises from about 5% to 25% of the weight of the crude wax. It is a hard, waxy material, dark in color and somewhat resinous in appearance. It is useful in wax formulation, notably in the preparation of polishes.

In FIGURE 1, the alcohol phase, e.g., methanol, containing the crude wax is introduced through line 1 into mixer 3 at a temperature of about 60° C., and the paraffin phase, e.g., n-heptane, is introduced through line 2 into mixer 15 at a temperature of about 40° C. The methanol phase passes through the contact zones in the direction of decreasing temperature. The solvents are used in about equal volumes.

The hot methanol solution of crude wax, which has been separated from the insoluble fraction by filtration or some other suitable means, is charged to mixer 3 where it is contacted with the immiscible heptane extract phase which comes in through line 13 from settler 4. The phases are passed through line 5 and allowed to separate in settler 6. Then the heptane phase is sent out of settler 6 as finished extract through overhead line 7 and the methanol raffinate phase is passed through line 8 into mixer 9 where it is contacted with the heptane phase extract which comes in through line 17 from settler 11. The phases in mixer 9 are passed through line 12 and allowed to separate in settler 4. Then the heptane phase is passed out of the top through line 13 to mixer 3, and the methanol phase is passed out of the bottom through line 14 to mixer 15 where it is agitated with fresh heptane solvent. The phases in mixer 15 are passed through line 16 and allowed to separate in settler 11. Then the heptane phase is passed through line 17 into mixer 9 and the methanol phase is removed as final raffinate from the bottom of settler 11 through line 18.

In the system described above the temperature in mixers 3, 9 and 15 is approximately 55°, 50° and 45° C., respectively. The temperature gradient across the zones of a continuous multiple contact extraction system depends on the temperature of the incoming phases at the terminals, and on the volume and heat capacity of each of the phases. The temperature gradient can vary from a large temperature increment between the terminal ends of the system to one where there is either a narrow temperature gradient range, or no temperature gradient at all, i.e., a constant temperature system. If desired, heat may be added or extracted at any stage to vary the temperature gradient between stages.

Whether constant or gradient, the temperatures useful in the continuous extraction system of this invention are those between about 40° and 150° C. When the higher temperatures are used it is sometimes necessary or desirable to impose superatmospheric pressure on the systems to raise the temperature and to suppress solvent vapors. The pressures useful for this purpose can vary from atmospheric to 10 atmospheres.

The material remaining in the final raffinate is the dark color, semi-liquid substance, referred to above as "balsam." This fraction can be used in the formulation of cosmetics, detergents, and the like.

The continuous plate column is another multiple stage contact liquid/liquid extraction system which is especially applicable for the processes of this invention. Most of the standard plate column forms used for large scale liquid/liquid extraction are satisfactory.

In one demonstration of Douglas fir wax refining in a continuous plate extraction column, the wax is treated with hot 95% methanol and the resulting wax solution is passed into the column near the top. m-Heptane is pumped into the column near the bottom. The heavier methanol solution and the lighter heptane solvent pass each continuously and countercurrently as immiscible phases through the plates of the column. The wax components pass between the phases according to their preferential solubility. The temperature is preferably maintained between about 40 and 100° C.

The heptane-soluble components are recovered from the top of the column in the heptane phase and the methanol-soluble components pass out the bottom in the methanol phase.

In the multiple stage extraction system, as in the simple single stage system, the wax may be introduced in solution in either of the two immiscible solvents. The desirable extraction is dictated by economic considerations, product requirements, equipment design, or possibly by the properties of a particular batch of crude wax.

The methods of this invention give refined wax products which are not identical in constituents with the waxes obtained by the methanol refining method described in the copending application of Fred W. West, previously referred to in the above description; these waxes are superior in properties to the waxes obtained by the copending application method for the same number of refinement steps. While it is not desired to be bound by any particular theory of operation, it is believed that the method of this invention is superior because the crude wax components are fractionated not only on the basis of their solubility in alcohol or rejection therefrom, as in the copending application method, but also on the basis of their relative solubility in a normally liquid paraffin when this phase is in contact with an immiscible alcohol phase.

The superior waxes of this invention that are recovered from the paraffin phase are vastly improved in properties important to hard wax users in the industry.

In general, the oil retention is equal to or better than the popular hard waxes. The ability to bind solvents is good. The gloss is excellent and the color satisfies the color requirements for most hard wax applications. The melting point is increased considerably and the hardness is markedly improved over crude wax.

The following examples are illustrative of this invention and are not meant to be unnecessarily limitive thereof.

*Example I*

This example demonstrates the fractionation of crude hexane-extracted Douglas fir bark wax in a single state liquid/liquid extraction system.

The following mixture is prepared:

| | Grams |
|---|---|
| Hexane | 200 |
| Methanol | 190 |
| Water | 10 |
| Hexane-soluble wax | 20 |

The mixture is heated with agitation to 50° C. at which temperature all of the wax dissolved. The two liquid phases are allowed to stratify and are separated.

The top layer hexane phase contains the harder, waxy material with a needle penetration of 0.3 mm. and amounts to a yield of 53%. The original crude hexane-soluble wax is much softer, having a penetration of 1.0 mm. The methanol-water phase contains a soft, tacky balsam fraction.

*Example II*

This example demonstrates the fractionation of crude Douglas fir wax in a continuous multiple stage liquid/liquid extraction column.

Figure 2:
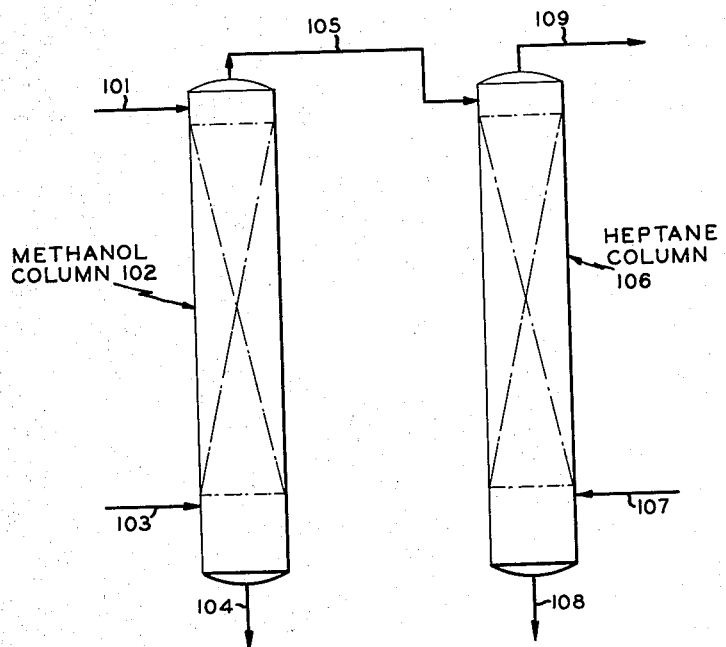

Two identical columns are set up in series as illustrated in FIGURE 2.

The cylindrical plate columns are 2' x 36' in dimension. They are packed with a 30' bed of 1" Raschig rings.

Crude Douglas fir wax at a temperature of 156° F. is pumped through line 101 into column 102 at the rate of 1000#/hr.

Hot methanol is pumped through line 103 into the same column near the bottom at the rate of 10,012#/hr. Sufficient pressure is applied to maintain a temperature of at least 156° F. in the column. The components of the wax soluble in hot 95% methanol are dissolved as the methanol passes upward countercurrent to the wax which is passing downward. The hot methanol insolubles are withdrawn from the bottom of the column through line 104 at the rate of 240#/hr. in addition to 12#/hr. of methanol.

The methanol extract passes out of the top of the column through line 105 and is introduced into column 106 near the top.

Heptane solvent is pumped through line 107 into column 106 near the bottom at the rate of 10,000#/hr. The column is maintained at a temperature of about 140° F.

The two solvent phases pass countercurrently through the column. The methanol phase containing the balsam fraction is withdrawn from the bottom through line 108 at the rate of 10,360#/hr. This rate corresponds to 360#/hr. of balsam.

The heptane phase is collected from the top of the column through line 109 at the rate of 10,400#/hr. This corresponds to 400#/hr. of refined wax. The wax is recovered by flashing off the solution solvent.

We claim:

1. A method of refining a Douglas fir bark derived wax product which is soluble in a normally liquid paraffin having from 5 to 10 carbon atoms, which comprises admixing said wax product with an immiscible solvent system having a normally liquid paraffin phase in contact with an alcohol phase, said paraffin phase comprising a paraffin having 5 to 10 carbon atoms, said alcohol phase comprising an alcohol having 1 to 4 carbon atoms, allowing the components of the wax to equilibrate between the phases and recovering a hard wax fraction from the paraffin phase.

2. A method of obtaining a refined wax product which comprises extracting from Douglas fir bark a fraction which is soluble in a normally liquid paraffin having 5 to 10 carbon atoms, and introducing said fraction into an immiscible solvent system having a normally liquid paraffin phase in contact with a separate alcohol phase, said paraffin phase comprising a paraffin having from 5 to 10 carbon atoms, said alcohol phase comprising an alcohol having from 1 to 4 carbon atoms, allowing the components of the wax to equilibrate between the phases and recovering a hard wax fraction from the paraffin phase.

3. The method of claim 2 wherein the alcohol phase comprises ethanol.

4. The method of claim 2 wherein the alcohol phase comprises isopropyl alcohol.

5. The method of claim 2 wherein the alcohol phase comprises propylene glycol.

6. A method of obtaining a refined wax product which comprises extracting a fraction from Douglas fir bark by solution in a normally liquid paraffin having 5 to 10 carbon atoms, and introducing said fraction into an immiscible solvent system having a normally liquid paraffin phase in contact with a separate alcohol phase, said paraffin phase comprising a paraffin having from 5 to 10 carbon atoms, said alcohol phase comprises an alcohol having from 1 to 4 carbon atoms allowing the components of the wax to equilibrate between the phases and recovering a hard wax fraction from the paraffin phase.

7. A method of obtaining a refined wax product which comprises extracting a fraction from Douglas fir bark with a solvent selected from the group consisting of low-boiling halogenated hydrocarbons and low-boiling aromatic hydrocarbons, and introducing the components of said fraction, which are soluble in a normally liquid paraffin having from 5 to 10 carbon atoms, into an immiscible solvent system having a normally liquid paraffin phase in contact with a separate alcohol phase, said paraffin phase comprising a paraffin having 5 to 10 carbon atoms, said alcohol phase comprising an alcohol having from 1 to 4 carbon atoms, allowing the components of the wax to equilibrate between the phases and recovering a hard wax fraction from the paraffin phase.

8. A method of refining a Douglas fir bark derived wax product which is soluble in a normally liquid paraffin having from 5 to 10 carbon atoms, which comprises treating said paraffin soluble wax with hot alcohol having from 1 to 4 carbon atoms to obtain an alcohol solution of the major portion thereof and employing said alcohol solution as a phase in an immiscible solvent system maintained at a temperature between about 20 and 150° C. having said alcohol solution in contact with a separate normally liquid paraffin phase, comprising a paraffin having from 5 to 10 carbon atoms, allowing the components of the wax to equilibrate between the phases and recovering a hard wax fraction from the paraffin phase.

9. A method of obtain a refined wax product which comprises extracting a fraction from Douglas fir bark by solution in a petroleum naphtha having a boiling point range within the limits of about 50 and 175° C., and introducing said naphtha extract solution into an immiscible solvent system maintained at a temperature between about 20 and 150° C. having said naphtha solution in contact with a separate alcohol phase, comprising an alcohol having from 1 to 4 carbon atoms allowing the components of the wax to equilibrate between the phases and recovering a hard wax fraction from the naphtha phase.

10. A method of obtaining a refined wax product which comprises extracting a fraction from Douglas fir bark by solution in petroleum naphtha having a boiling point range within the limits of about 50 and 175° F., treating said naphtha-soluble fraction with hot alcohol, having from 1 to 4 carbon atoms, to obtain an alcohol solution of the major portion thereof and employing said alcohol solution as a phase in an immiscible solvent system maintained at a temperature between about 20 and 150° C. having said alcohol solution in contact with a separate naphtha phase, comprising a naphtha having a boiling point range within the limits of about 50 and 175° C., allowing the components of the wax to equilibrate between the phases and recovering a hard wax fraction from the naphtha phase.

11. A method of obtaining a refined wax product which comprises extracting a fraction from Douglas fir bark by solution in normal heptane and treating said heptane-soluble fraction with hot alcohol, having 1 to 4 carbon atoms, to obtain an alcohol solution of the major portion thereof and employing said alcohol solution as a phase in an immiscible solvent system maintained at a temperature between about 20 and 150° C. having said alcohol solution in contact with a separate normal heptane phase, allowing the components of the wax to equilibrate between the phases and recovering a hard wax fraction from the heptane phase.

12. A method of obtaining a refined wax product which comprises extracting a fraction from Douglas fir bark by solution in normal hexane and treating said normal hexane-soluble fraction with hot alcohol, having 1 to 4 carbon atoms, to obtain an alcohol solution of the major portion thereof and employing said alcohol solution as a phase in an immiscible solvent system maintained at a temperature between about 20 and 150° C. having said alcohol solution in contact with a separate normal hexane phase, allowing the components of the wax to equilibrate between the phases and recovering a hard wax fraction from the hexane phase.

13. A method of refining a Douglas fir bark derived wax product which is soluble in a normally liquid paraffin having from 5 to 10 carbon atoms, which comprises introducing said fraction into an immiscible solvent system maintained at a temperature between about 40 and 100° C. having a normally liquid paraffin phase in contact with a methanol phase, said paraffin phase comprising a paraffin having from 5 to 10 carbon atoms, said methanol phase containing 0.5 to 10 percent water, allowing the components of the wax to equilibrate between the phases and recovering a hard wax fraction from the paraffin phase.

14. The method of claim 13 wherein the paraffin solvent phase in the immiscible solvent system comprises normal heptane.

15. The method of claim 13 wherein the paraffin solvent phase in the immiscible solvent system comprises normal hexane.

16. A method of obtaining a refined wax product which comprises extracting a fraction from Douglas fir bark by solution in a petroleum naphtha having a boiling point range within the limits of about 50 and 175° C., treating said naphtha-soluble fraction with hot methanol to obtain a methanol solution of the major portion thereof, said methanol solvent containing between about 0.5 to 10 percent water, and employing the methanol solution as a phase in an immiscible solvent system maintained at a temperature between about 40 and 100° C. having said methanol solution in contact with a separate naphtha phase, comprising a naphtha having a boiling point range within the limits of about 50 and 175° C., allowing the components of the wax to equilibrate between the phases and recovering a hard wax fraction from the naphtha phase.

17. A method of refining a Douglas fir bark derived wax product which is soluble in a normally liquid paraffin having from 5 to 10 carbon atoms, which comprises treating said paraffin-soluble wax with hot methanol to obtain a methol solution of the major portion thereof, said methanol solvent containing between about 0.5 to 10 percent water and employing the methanol solution as a phase in an immiscible solvent system maintained at a temperature between about 40 and 100° C., passing said methanol phase through a series of zones in contact with a separate normally liquid paraffin phase which flows through the aforementioned series of contact zones countercurrently to the passage of said methanol phase, said paraffin phase comprising a paraffin having from 5 to 10 carbon atoms, said contact zones having temperatures which decrease in the direction of the flow of the methanol phase, allowing the components of the wax to equilibrate between the phases in each contact zone and separating a hard wax fraction from the paraffin phase withdrawn from the contact zone maintained at the highest temperature.

References Cited in the file of this patent

UNITED STATES PATENTS

| | | |
|---|---|---|
| 2,662,893 | Kurth | Dec. 15, 1953 |
| 2,781,336 | Zenczak | Feb. 12, 1957 |